(12) United States Patent
Boswell et al.

(10) Patent No.: US 8,731,387 B2
(45) Date of Patent: May 20, 2014

(54) SYSTEMS APPARATUS, AND METHODS FOR STABILIZING MOBILE DEVICES

(75) Inventors: Brent Lee Boswell, Kingsland, TX (US); Nathan Bruce Fambro, Cedar Park, TX (US)

(73) Assignee: Dynamo Innovations Group, Inc., Stephenville, TX (US)

( * ) Notice: Subject to any disclaimer, the term of this patent is extended or adjusted under 35 U.S.C. 154(b) by 0 days.

(21) Appl. No.: 13/561,042

(22) Filed: Jul. 29, 2012

(65) Prior Publication Data

US 2013/0034348 A1 Feb. 7, 2013

Related U.S. Application Data

(60) Provisional application No. 61/514,853, filed on Aug. 3, 2011.

(51) Int. Cl.
*G03B 17/00* (2006.01)
*G03B 17/56* (2006.01)
*F16M 13/04* (2006.01)

(52) U.S. Cl.
CPC ............... *G03B 17/56* (2013.01); *F16M 13/04* (2013.01)
USPC ............................................ 396/55; 396/421

(58) Field of Classification Search
USPC .................. 396/55, 419, 421, 424, 428, 420; 348/375–376; 248/187.1
See application file for complete search history.

(56) References Cited

U.S. PATENT DOCUMENTS 7,563,038 B2 *  7/2009  Hershenzon ................... 396/419
8,287,194 B2 * 10/2012  Orf ................................ 396/419

* cited by examiner

*Primary Examiner* — W B Perkey
*Assistant Examiner* — Minh Phan
(74) *Attorney, Agent, or Firm* — The Villhard Patent Group

(57) ABSTRACT

Systems, apparatus, methods, etc. for stabilizing mobile devices. Various embodiments provide stabilizers which comprise a counter weight lever, a counter weight, and a handle. A yaw axis defined by a pivot point which can extend through a side of the mobile device. Moreover, the lever couples to the mobile device near its proximal end and to the counter weight at its distal end. Furthermore, the handle pivots about the mobile device at a point on the yaw axis of the mobile device. Additionally, the handle and the mobile device are biased toward each other along the yaw axis. In some embodiments the stabilizer includes a bi-conical joint or a tapered edge joint which defines the pivot point. Some stabilizers include a hinge pin to which the counter weight lever and mobile device are coupled. Furthermore, the handle can be biased toward the pivot point along the pitch and/or roll axes.

9 Claims, 16 Drawing Sheets

SYSTEMS APPARATUS, AND METHODS FOR STABILIZING MOBILE DEVICES

RELATED APPLICATIONS

This application claims priority to U.S. provisional patent application No. 61/514,853 entitled Case To Contain And Stabilize A Mobile Device, filed by Boswell et al., on Jul. 28, 2011, the contents of which are incorporated herein as if set forth in their entirety.

BACKGROUND

Life unfolds in often spontaneous moments. Understandably, most individuals want to capture images (whether static or dynamic) of these moments. To do so, they often use mobile devices which incorporate digital cameras therein. These mobile devices happen to be lightweight, enjoy small form factors, and (anymore) seem nearly ubiquitous. Moreover, these devices are becoming smaller as time goes by and technology advances. Whereas mobile devices were once luxuries, now, many individuals carry one or more mobile devices on their bodies and (when stationary) keep these mobile devices nearby.

Yet some of the very advantages of these mobile devices at least partially render them unsuitable for capturing images. For instance, their lightweight allows even small disturbances to shake, vibrate, rotate, and/or otherwise move many mobile devices. Their small form factors aggravate this condition since a user wishing to capture an image has only a small device to grasp. The mobile device therefore tends to vibrate, undulate, oscillate, and otherwise move while the user attempts to obtain an image. These movements, in turn, render the image blurry, jerky, and/or otherwise less than aesthetically pleasing.

SUMMARY

The following presents a simplified summary in order to provide a basic understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed disclosure that is presented herein. The current disclosure provides systems, apparatus, methods, etc. for stabilizing mobile devices and more particularly for stabilizing handheld cellular telephones which include video cameras and doing so during the capture of video images by these devices.

Some embodiments provide stabilizers for mobile devices which include cameras. Such stabilizers comprise a mobile device retainer, a counter weight lever, a counter weight, and a handle. The mobile device retainer retains the mobile device and defines a yaw axis (that extends through a side of the mobile device and is coupled to the retainer near its proximal end. Near its distal end, the counter weight lever couples to the counter weight. Meanwhile, the handle pivots about the mobile device retainer at a pivot point on the yaw axis with the combined center of gravity of the mobile device and the retainer being farther from the side of the mobile device retainer than is the pivot point. Thus, in some situations, the counterweight biases the mobile device retainer and the handle together.

Some stabilizers of the current embodiment include a bi-conical joint or tapered edge joint located at the pivot point. In some stabilizers the counter weight lever pivotably couples with the mobile device retainer via a hinge pin. Furthermore, the hinge pin can partially define the bi-conical or tapered edge joint and/or the handle can be positioned at the pivot point. In some embodiments, in which the handle is positionable at the pivot point, the counter weight lever can include a retainer for the handle. In some embodiments, the position of the counter weight can be adjusted along the roll, yaw, and/or pitch axes. In the alternative, or in addition, a biasing member biases the counter weight lever and the handle together along at least one axis which is perpendicular to the yaw axis. If desired, the counter weight lever partially retains the handle.

Various embodiments provide stabilizers which comprise a counter weight lever, a counter weight, and a handle which stabilize mobile devices. The pivot point has associated there with orthogonal yaw, roll, and pitch axes, with the yaw axis extending through a side of the mobile device. Moreover, the counter weight lever is operationally couplable to the mobile device near its proximal end and it is coupled to the counter weight at its distal end. Regarding the handle, of the current embodiment, the handle is pivotable about the mobile device at a pivot point on the yaw axis. Additionally, the handle and the mobile device are biased toward each other along the yaw axis.

In some embodiments the stabilizer includes a bi-conical joint or tapered edge joint located at, or defining, the pivot point. In the alternative, or in addition, some stabilizers include a hinge pin to which the counter weight lever and mobile device are operationally coupled. Some stabilizers can include a handle retainer on the counter weight lever so that the handle can be retained thereby while also allowing the handle to be positioned at the pivot point at other times. Furthermore, the handle can be biased by biasing members toward the pivot point along the pitch and/or roll axes. If desired, the pivot point can be self-centering. Some stabilizers allow the handle and the mobile device to have three degrees of relative rotational movement.

To the accomplishment of the foregoing and related ends, certain illustrative aspects are described herein in connection with the annexed figures. These aspects are indicative of various non-limiting ways in which the disclosed subject matter may be practiced, all of which are intended to be within the scope of the disclosed subject matter. Other advantages and novel features will become apparent from the following detailed disclosure when considered in conjunction with the figures and are also within the scope of the disclosure.

BRIEF DESCRIPTION OF THE FIGURES

The detailed description is described with reference to the accompanying figures. In the figures, the left-most digit(s) of a reference number usually corresponds with the figure in which the reference number first appears. The use of the same reference numbers in different figures indicates similar or identical items.

DETAILED DESCRIPTION

This document discloses systems, apparatus, methods, etc. for stabilizing mobile devices and more particularly for stabilizing hand-held cellular telephones (which include video cameras) during the capture of images by the same.

Figure 1:
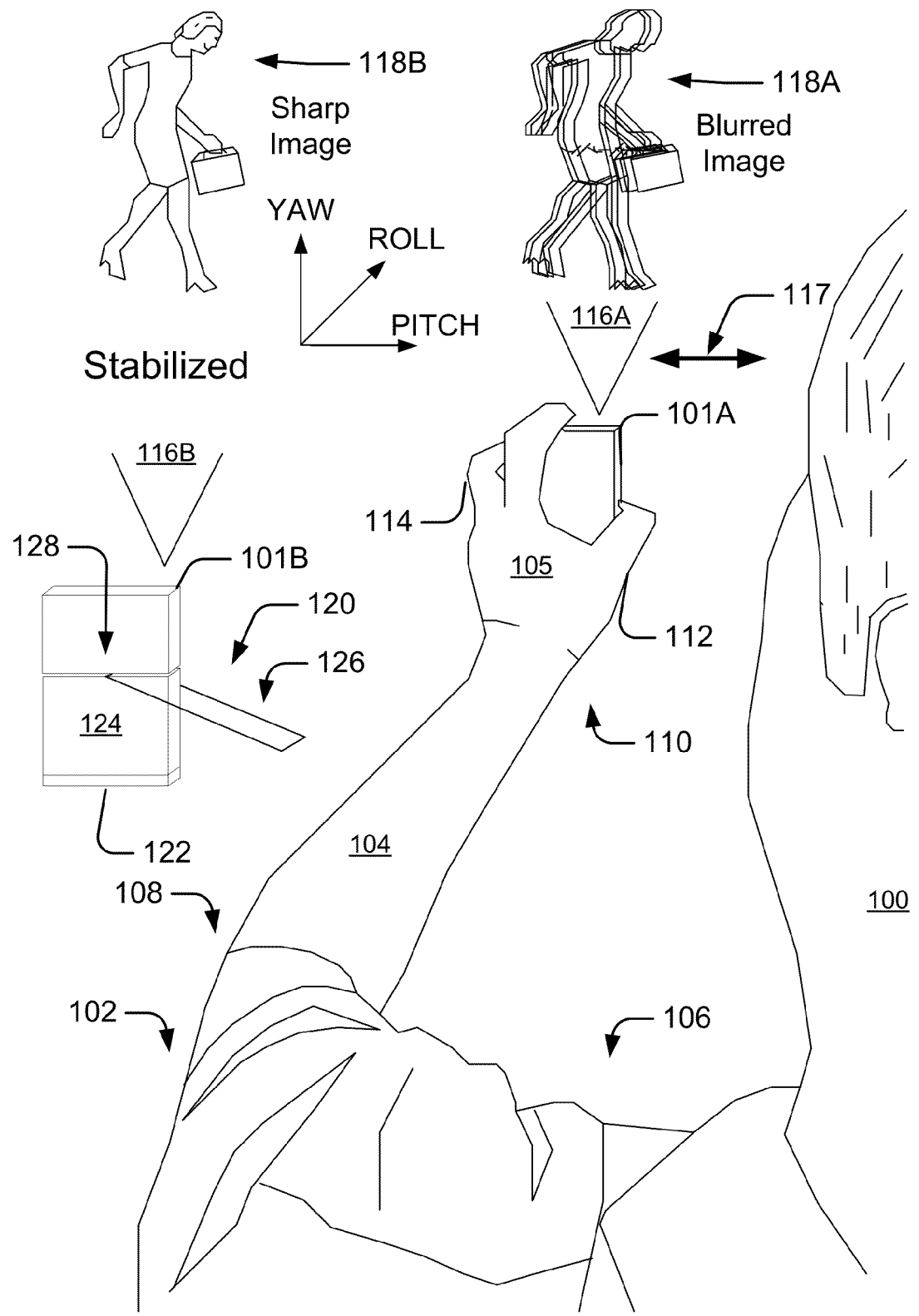
FIG. 1 illustrates a perspective view of two mobile devices capturing images of a subject.

FIG. 1 illustrates a perspective view of two mobile devices capturing images of a subject. Despite the undesired movements of typical mobile devices, users generally desire to capture images with them that accurately reflect the appearance of the real-world scenes they wish to memorialize. For instance, a parent might wish to capture their child opening birthday presents, a sports reporter might wish to capture a winning touchdown, a camera operator might want to film close ups of an action scene, etc. Embodiments, disclosed herein allow such users to capture more faithful images of their subjects.

FIG. 1 also illustrates a user 100, two mobile devices 101A and 101B, an upper arm 102, a forearm 104, a hand 105, a shoulder 106, an elbow 108, a wrist 110, a thumb 112, several finger 114, two fields of view 116A and 116B, a movement of the mobile device (as indicated by reference) 117, and two images 118A and 118B. Additionally, FIG. 1 illustrates a stabilizer 120 which includes a counterweight 122, a counterweight lever 124, and a handle 126 which cooperate via a fulcrum or pivot point 128. Of course, those skilled in the art understand that the user 100 often grasps the mobile device 101A using their hand 105. The user's hand 105 though happens to be at the end of their arm.

Indeed, the user's arm (and body for that matter) typically imparts a number of modes of undesired movement to the mobile device 101A in addition to the desired or intended movement. At a general level, movements of the user 100 will obviously cause the mobile device 101A to move in often undesirable manners. Walking, for instance, tends to jog the mobile device 101 with each step, jump, etc. The user's shoulder 106 also imparts movement to the mobile device 101A since the shoulder 106 of most users 100 possesses at least two degrees of rotational freedom.

At the distal end of the user's upper arm 102, the elbow 108 superimposes at least two more degrees of (rotational) freedom on the overall motion of the mobile device 101A. Similarly, the user's wrist 110 imparts at least another two degrees of rotational to the movement of the mobile device 101A. Of course, the various joints in the user's hand 105, thumb, 112, and fingers 114 also cause the mobile device 101A to move relative to the subject. Taken together, the kinematic linkage of the user's arm (and body) cause the mobile device 101A to move in often erratic, unexpected, and undesirable (from an image capture perspective) manners.

As a result, the field of view 116 of the camera in the mobile device 101A gyrates widely at times when compared to the stability for it which the user might desire. Reference 117 indicates such movements while the blurry image 118A illustrates some of its results. More particularly, instead of allowing the capture of one sharp, distinct image 118B of the subject, the movement of the mobile device 101A often causes the capture of more than one image within a frame (or while the mechanical or electronic "shutter" is open for a still shot). The result is that the captured image 118A appears to be blurry, to jerk, etc. when viewed by the user 100.

Some embodiments provide stabilizers 120 to counter the effects of such undesired motions during image capture. The stabilizer 120 of the current embodiment includes the counterweight 122, the counterweight lever 124, and the handle 126 which cooperate via the pivot point 128 to stabilize the mobile device 101B. Thus, whereas the un-stabilized device 101A captures a blurred image 118A, the stabilized mobile device 101B captures a relatively sharp, or relatively unblurred, image 118B. Thus, herein, stabilize will be used in the sense of eliminating or reducing unwanted, transient, erratic, etc. movement of a mobile device while largely transferring the wanted or desired movement to the mobile device.

To that end, embodiments such as illustrated by FIG. 1 are provided by the current disclosure. More specifically, the stabilizer 120 uses the counterweight 122 located at the distal end of the counterweight lever 124 to stabilize the mobile device 101B. The user grips the handle 126 and maneuvers the mobile device 101B to capture images of subjects. Because the stabilizer 120 stabilizes the mobile device 101B, its field of view 116B remains steadier than would otherwise be the case thereby enabling the mobile device 101B to capture sharper, less blurry images 118B as compared to those captured by conventional mobile devices 101A.

Figure 2:
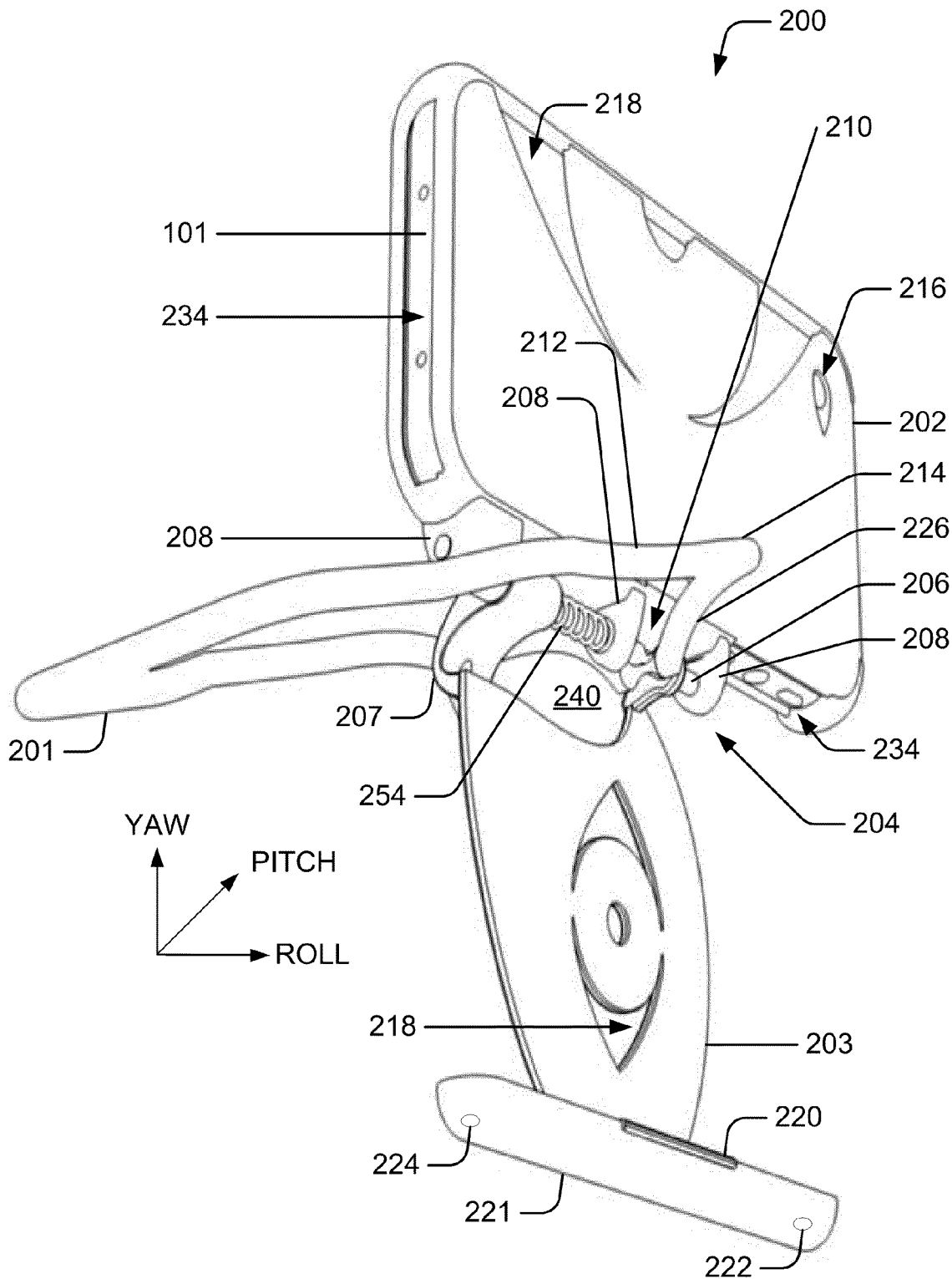
FIG. 2 illustrates a perspective view of a mobile device and stabilizer with the stabilizer deployed.

FIG. 2 illustrates a perspective view of a mobile device and stabilizer with the stabilizer deployed. During the disclosure herein reference to FIGS. 3-9, in addition to FIG. 2, might be beneficial. The stabilizer 200 (of the current embodiment) includes a handle 201, a mobile device retainer 202, a counterweight lever 203, a hinge 204, a hinge pin 206, several hinge frames 207 and 208, a joint 210, two finger grips 212, two arcuate ridges 214, a camera aperture 216, several mass balancing cavities 218, a coupling 220, a counterweight 221, a counterweight adjustment cavity 222, and a pair of prongs 226 among other features. As is further disclosed herein the handle 201 cooperates with the counterweight 221 (via the counter weight lever 203 and the joint 210) to stabilize the mobile device 101.

Before discussing the stabilizer 200 in general it might be informative to discuss aspects of various individual portions of the stabilizer 200 of the current embodiment. Moreover, merely for the sake of convenience, a coordinate system will sometimes be referred to in which a set of orthogonal axes is designated and assumed to originate at the joint 210 or some other convenient reference point. Moreover, for the embodiment shown, the roll (or x) axis will be said to extend in a direction generally parallel to the longest of the sides (or faces) of the mobile device 101. A yaw (or y) axis will be said to extending in a direction generally parallel to the next longest of the sides of the mobile device 101. Furthermore, a pitch (or z) axis will be designated as extending from the joint 210 in a direction generally parallel to the shortest of the sides of the mobile device 101 as illustrated in FIG. 2. However, it is specifically noted here that the mobile device 101 of many embodiments remains free to rotate relative to the joint 210.

That being said, the handle 201 of the current embodiment can be formed from relatively heavy gage wire, a small diameter rod, cast, forged, etc. Generally, the handle 201 forms a rectangular or oblong loop which a user can grasp at its distal end and move the mobile device 101 about in a stabilized manner. The overall size of the loop of the handle 201 can more or less reflect the size of the mobile device 101 as measured along the longest of the two pairs of sides of the mobile device 101. A pair of finger grips 212 at or near the proximal end of the handle 201 allow the user to place their fingers (and/or thumb) of one hand in these indentations to better grip the handle 201 and to maneuver the mobile device 101. Of course, the handle 201 can be sized to allow the user to place both hands on the handle 201.

The arcuate ridges 214 of the handle 201, which are adjacent to and meld with the finger grips 212 at their proximal end, are shaped and dimensioned to help place the finger grips 212 in relatively close proximity to the joint 210. The pair of prongs 226 can blend with and extend from the proximal ends of the arcuate ridges 214 in a direction toward the joint 210 in order to provide clearance between the handle 201 and the counterweight lever 203. While not being so limited, it has been found that the prongs 226 help in certain manners by providing pitch-axis related clearance between the handle 201 and the counterweight lever 203 and/or the mobile device retainer 202. Indeed, in some embodiments, the arcuate ridges 214 and prongs 226 cooperate to position the finger grips 212 at, or near, the roll and yaw axes while providing that pitch axis clearance. "Near," in this context, meaning being within a few widths of the medical device 102 from the pivot point.

While not wishing to be limited to the following theory, it is believed that positioning the finger grips 212 close to the joint 210 (with the arcuate ridges 214 and the prongs 226 between these two features) allows the user better ergonomic control over the position, translational (and rotational) velocity, translational (and rotational) momentum, etc. of the mobile device 101. Thus, from the finger grips 212, the loop of the handle extends through the arcuate ridges 214 and the prongs 226 and helps form the joint 210. In some embodiments, the handle 201 cooperates with the hinge pin 206 to form the joint 210 which can be self-centering. Moreover, the joint 210 can allow the handle 201 to pivot about the joint (or a pivot point therein) about all three rotational axes (yaw, pitch, and roll) for some corresponding ranges.

With continuing reference to FIG. 2, the mobile device retainer 202 also possesses certain features further disclosed herein. For instance, the mobile device retainer 202 can (in some embodiments) form a portion of the joint 210 (see FIGS. 10-15). However, for embodiments illustrated by FIG. 2, that is not necessarily the case. Rather the hinge pin 206 illustrated by FIG. 2 forms the corresponding portion of the joint 210. The mobile device retainer 202 also includes the hinge frames 208 which cooperate with the hinge pin 206 (and corresponding hinge frames 207 on the counterweight lever 203) to allow the counterweight lever 203 and mobile device retainer 202 to rotate relative to one another about the hinge pin 206.

Additionally, the mobile device retainer 202 can define a camera aperture 216 which allows the camera's line of sight to pass there through. A number of mass balancing cavities 218 also appear in FIG. 2 on the mobile device retainer 202. These mass balancing cavities 218 provide a way by which the designers of the stabilizers 200 can optimize the weight of the stabilizer 200 and balance its center of gravity (particularly when considered in conjunction with the mobile device 101 itself) at a select location. The centers of gravity can be balanced by empirically determining the mass and the location of the centers of gravity of particular mobile devices 101 and then mathematically computing where to place mass balancing features along with the amount of mass included therein (or excluded there from). In the alternative, or in addition, stabilizers 200 can be configured for particular mobile devices 101 by settling on a general design and then iterating the locations, numbers, masses, sizes, etc. of the various piece parts of the stabilizer 200 of interest. For instance, the positions of the hinge pin 206, counterweight 221, mass balancing cavities 218, etc. can be moved about as desired to balance the system.

Of course, the mobile device retainer 202 also includes, or defines, a cavity (not shown) for retaining the mobile device 101. Moreover, the mobile device retainer 202 of some embodiments includes rails, detents, latches, etc. which allow the mobile device retainer 202 to releasably retain the mobile device 101 therein. The manner of retaining the mobile device 101 is not necessarily germane to the stabilization functions provided by the current embodiment. However, the retention techniques used might affect the balance of the stabilizer 200 and/or system. Accordingly, the design of the stabilizer 200 can account for such effects.

The counter weight lever 203 also includes features pertinent to the current embodiment (as illustrated by FIG. 2). For instance, the counter weight lever 203 is coupled to the counter weight 221 at or near its distal end by a coupling 220 or other mechanical/structural connection. The overall length l1 of the counterweight lever 203 therefore acts as a moment arm about the joint 210 for the counter weight 221. The counterweight 221 can include (or define) counterweight adjustment cavities 222 and/or other weight balancing features such as mass balancing weights 224. Such features allow the designers of the stabilizers 200 to adjust the location of the center of gravity of the counterweight lever 203 as well as that of the center of gravity of the combined mobile device 101 and the stabilizer 200. For similar purposes, the current embodiment also provides mass balancing cavities 218 and other mass balancing features on the mobile device retainer 202. Furthermore, in some embodiments, the position of the counterweight 221 can be adjusted along directions parallel to one or more of the yaw, roll, and/or pitch axes. For instance, the counterweight can be mounted on slide rails, attached to a thumb screw mechanism, etc. to allow its position relative to the joint 210 to be adjusted.

As FIG. 2 also illustrates, the mobile device 101 can engage, and be retained by, the mobile device retainer 202 of the stabilizer 200. Furthermore, the counterweight lever 203 can rotate about the hinge 204 relative to the mobile device retainer 202. In this manner the counterweight lever 203 (and counterweight 221) can be stowed against the mobile device retainer 202 or placed in a deployed position (as illustrated by FIG. 2).

Furthermore, in its deployed position, the counterweight lever 203 holds the counterweight 221 at the end of a moment arm of length l1 so as to increase the moment of inertia possessed by the system about the pitch axis. Additionally, the counterweight 221 can be shaped so that much of its mass exists at either or both of its ends. Therefore its moment of inertia relative to the yaw axis is relatively increased. As a result, the overall system can be tuned to possess a certain amount of rotational inertia and hence stability about the roll and pitch axis. Furthermore, the inventors have found, with prototyping, that positioning the joint 210 generally in line along the yaw axis with the center of gravity of the overall system allows the combined moment of inertia of the system (about the pitch axis) to provide more than sufficient rotational stability.

With continuing reference to FIG. 2, the handle 201 can be a separate component apart from the other portions of the stabilizer 200 and/or can be (partially) retained by other portions of the stabilizer 200. Since the handle 201 can be a separate component, the counterweight lever 203 or mobile device retainer 202 can include clips, detents, etc. (not shown in FIG. 2) positioned and configured to cooperate with a portion(s) of the handle 201 to retain the same in a stowed position.

In addition, or in the alternative, the counterweight lever 203 or mobile device retainer 202 can define an enclosed aperture 240, window, etc. through which one of the legs of the handle 201 can pass so that the handle 201 is retained by the stabilizer 200 (yet can still move relative thereto). More specifically, the stabilizer 200 can be configured to retain the handle 201 against itself for compact safekeeping while also allowing the handle 201 to be positioned and rotated in the joint 210. In other words, when desired, the handle 201 can be placed in a stowed position on the stabilizer 200 and (at other times) placed in an operational position in the joint 210.

Once the user places the handle 201 in the joint 210, the user can then maneuver the mobile device 101 using the handle 201 while the stabilizer 200 stabilizes the instantaneous position of the mobile device 101 (and its camera). These results occur, it is believed, because the design of the stabilizer 200 for a particular type of mobile device 101 places the center of gravity of the stabilizer 200 below the joint 210 with the center of gravity of the mobile device 101 being above the joint 210. Moreover, it is also believed that, with a counterweight 221 of sufficient weight and configuration, the combined center of gravity of the stabilizer 200 and of the mobile device 101 also lies below the joint 210 along the yaw (or y) axis thereby lending the system inherent stability. However, the inventors do not wish to be held to this theory.

Such arrangements therefore cause the overall system to hang from the joint 210 (or handle 201 as the case may be). As a result of its inertia, the mobile device 101 will be delayed in following undesired short-term movements of the handle 201 downwardly along the yaw axis. Undesired movements of the mobile device 101 upwardly along the yaw axis tend to be negated by the weight of the mobile device 102 (or some other biasing member) while the self-centering nature of the joint 210 tends to restrict lateral movements of the mobile device 101 along the roll and pitch axes relative to the handle 201. Of course, here "up" and "down" are used in the sense of "along the yaw axis." These terms do not limit the stabilizer 200 to situations in which the yaw axis and/or stabilizer 200 are vertically oriented.

Yet, the joint 210 still allows rotational movement about the joint 210 in all three rotational degrees of freedom. Nonetheless, the angular inertia of the counterweight 221 and mobile device 101 tends to inhibit rotational motion of the mobile device 101 about the pitch, yaw, and roll axes. While relative translational and rotational movement is allowed between the handle 201 and the mobile device retainer 202 they are limited by various biasing mechanisms. Accordingly, only relatively gross movements (as input or otherwise directed by the user via the handle 201) translate to actual movements of the mobile device 101 despite the jerky, erratic etc. movements that the user's hand(s) might actually be experiencing. To this end, it has been found that increasing the distance 11 of the counterweight 221 from the joint 210 along the yaw axis tends to increase the stability of the mobile device 101 although the envelope of the stabilizer 200 might indicate that some upper limit to that separation might be considered.

Figure 3:
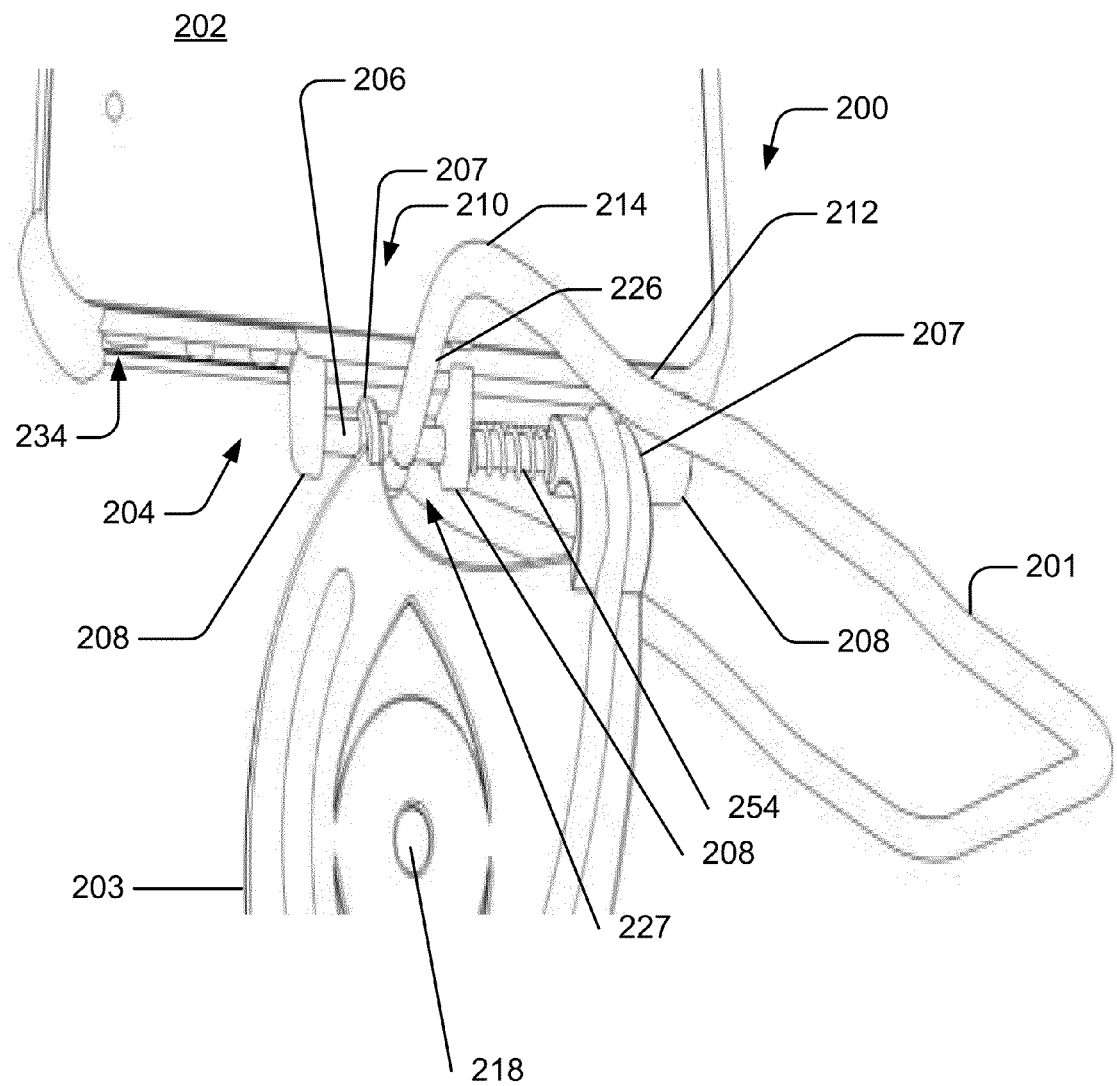
FIG. 3 illustrates a side elevation view of a mobile device and stabilizer with the stabilizer deployed.
Figure 4:
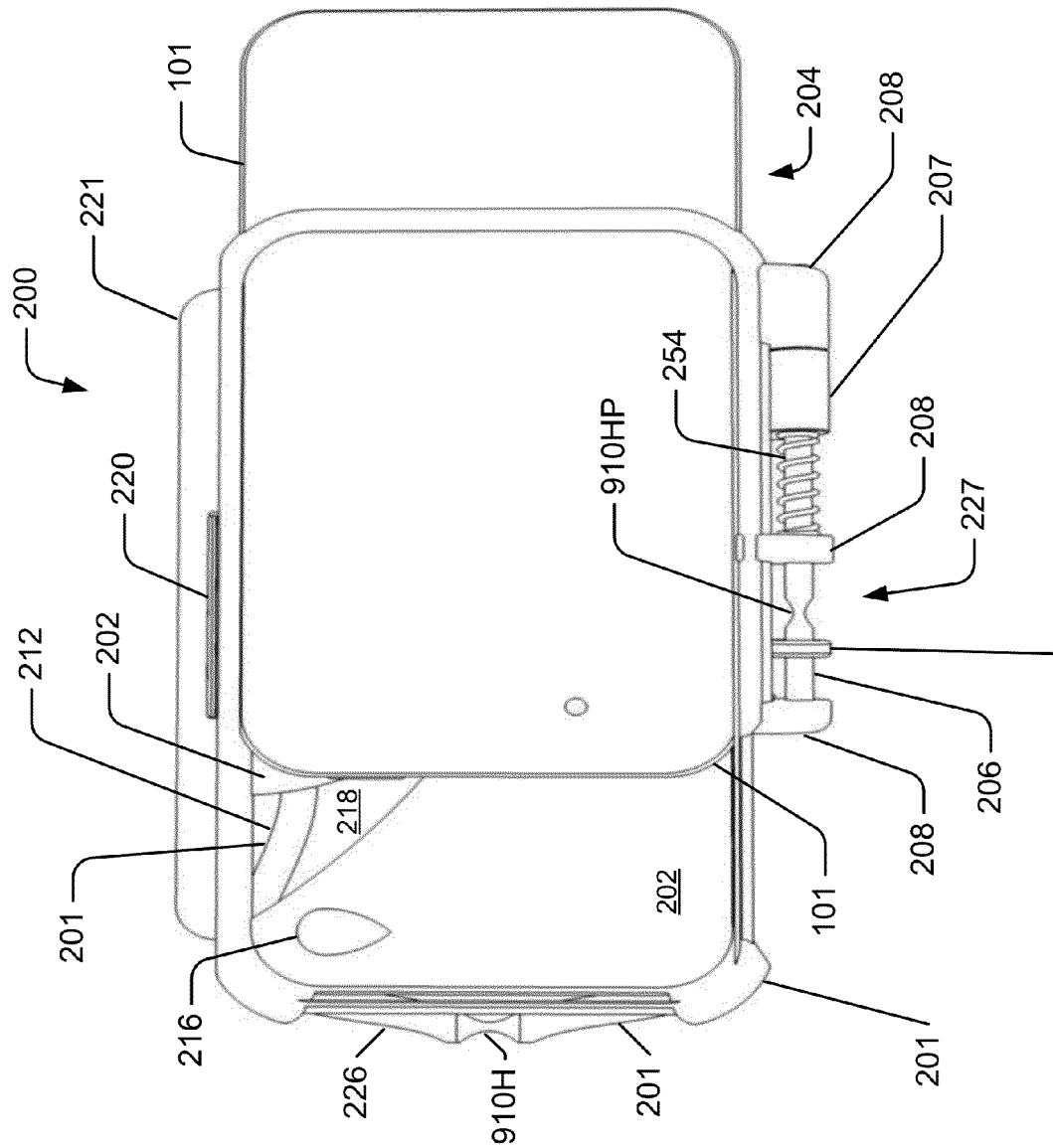
FIG. 4 illustrates a top plan view of a mobile device and stabilizer.
Figure 5:
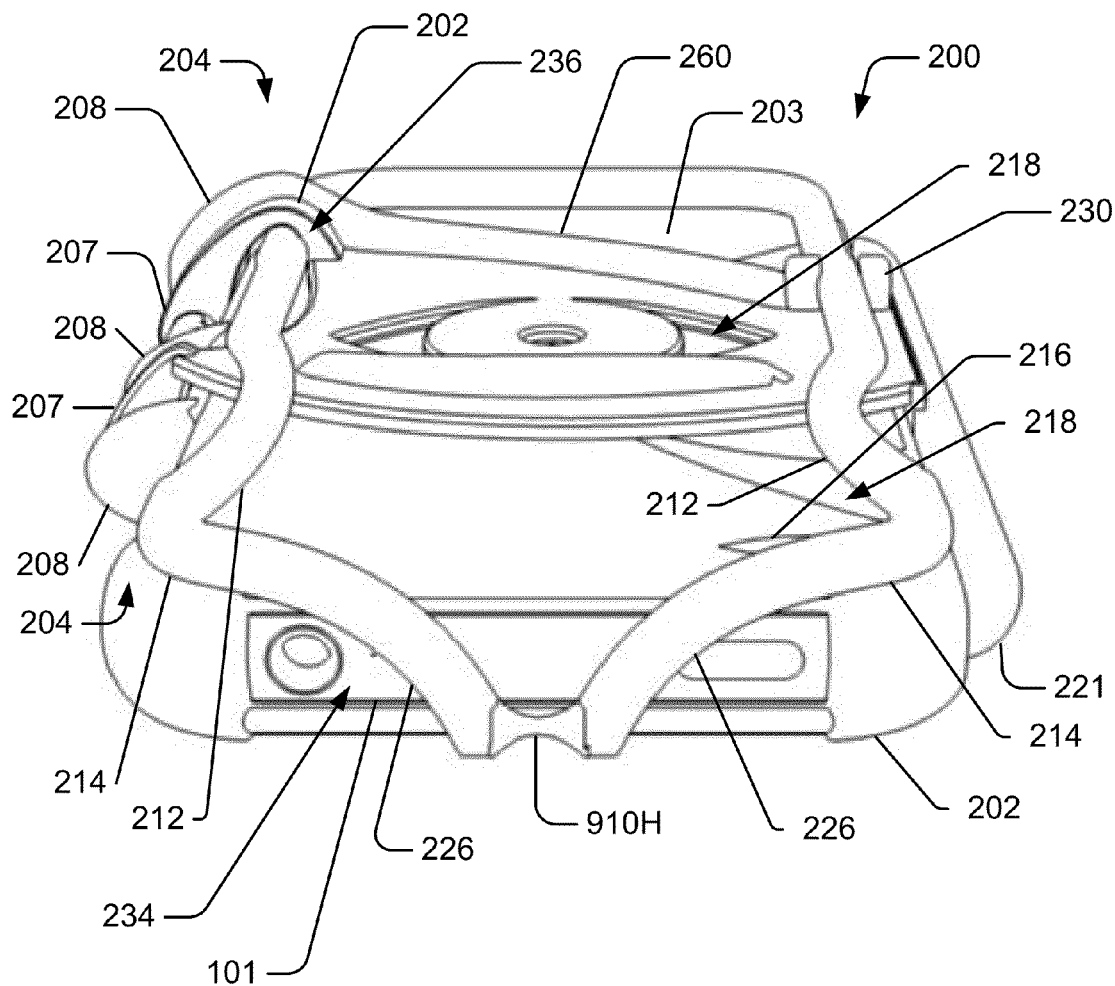
FIG. 5 illustrates a perspective view of a mobile device and stabilizer with the stabilizer stowed.
Figure 6:
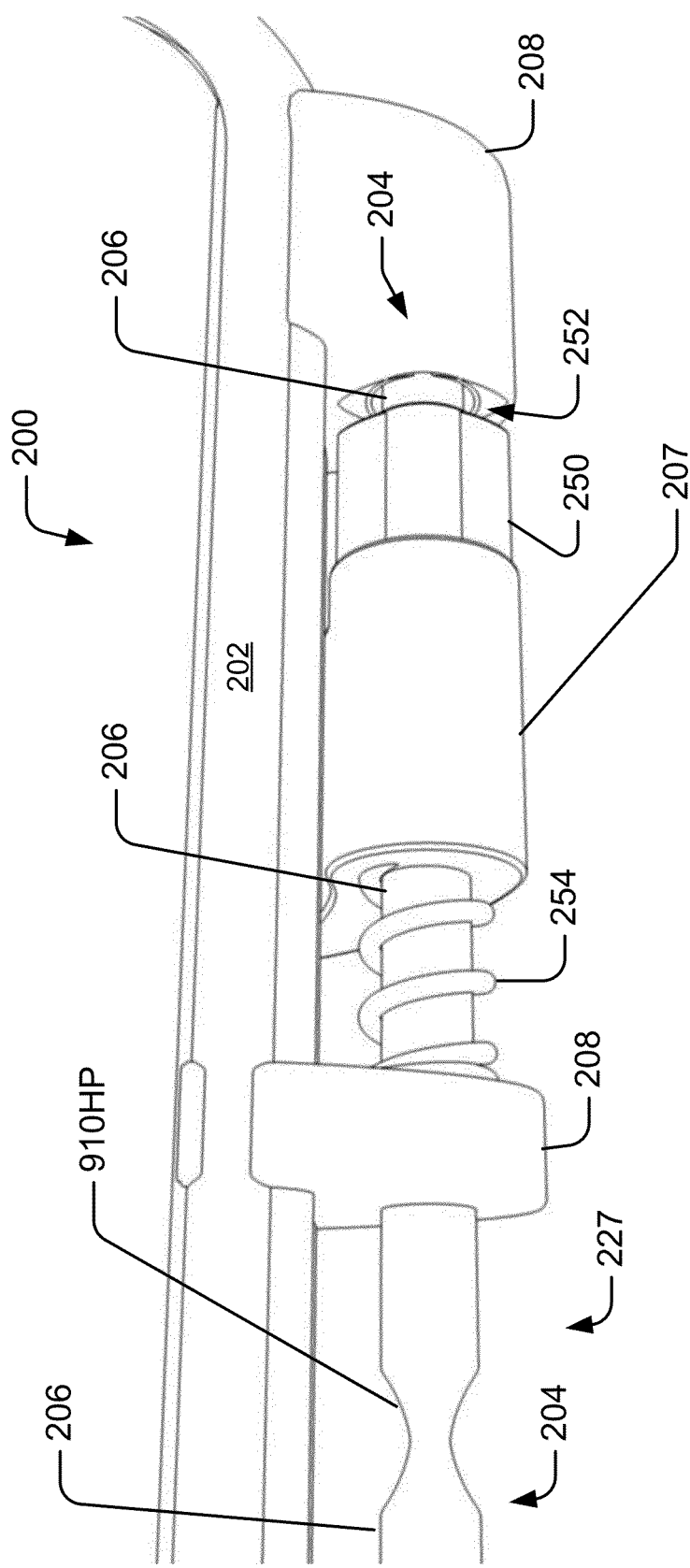
FIG. 6 illustrates a side elevation view of a mobile device and stabilizer with the stabilizer stowed against the mobile device.
Figure 7:
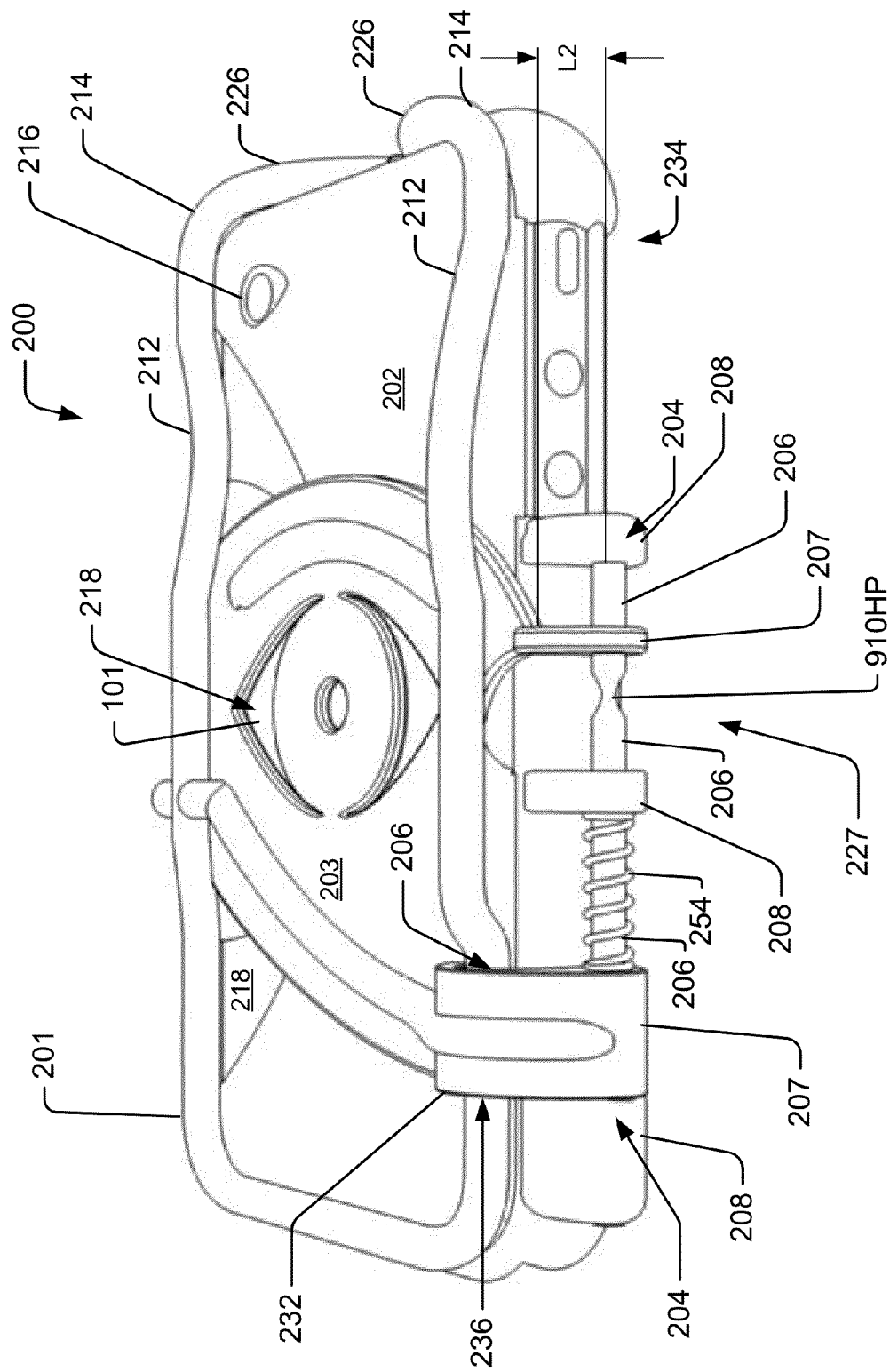
FIG. 7 illustrates a perspective view of a mobile device and stabilizer with the stabilizer and the handle in their retained positions.
Figure 8:
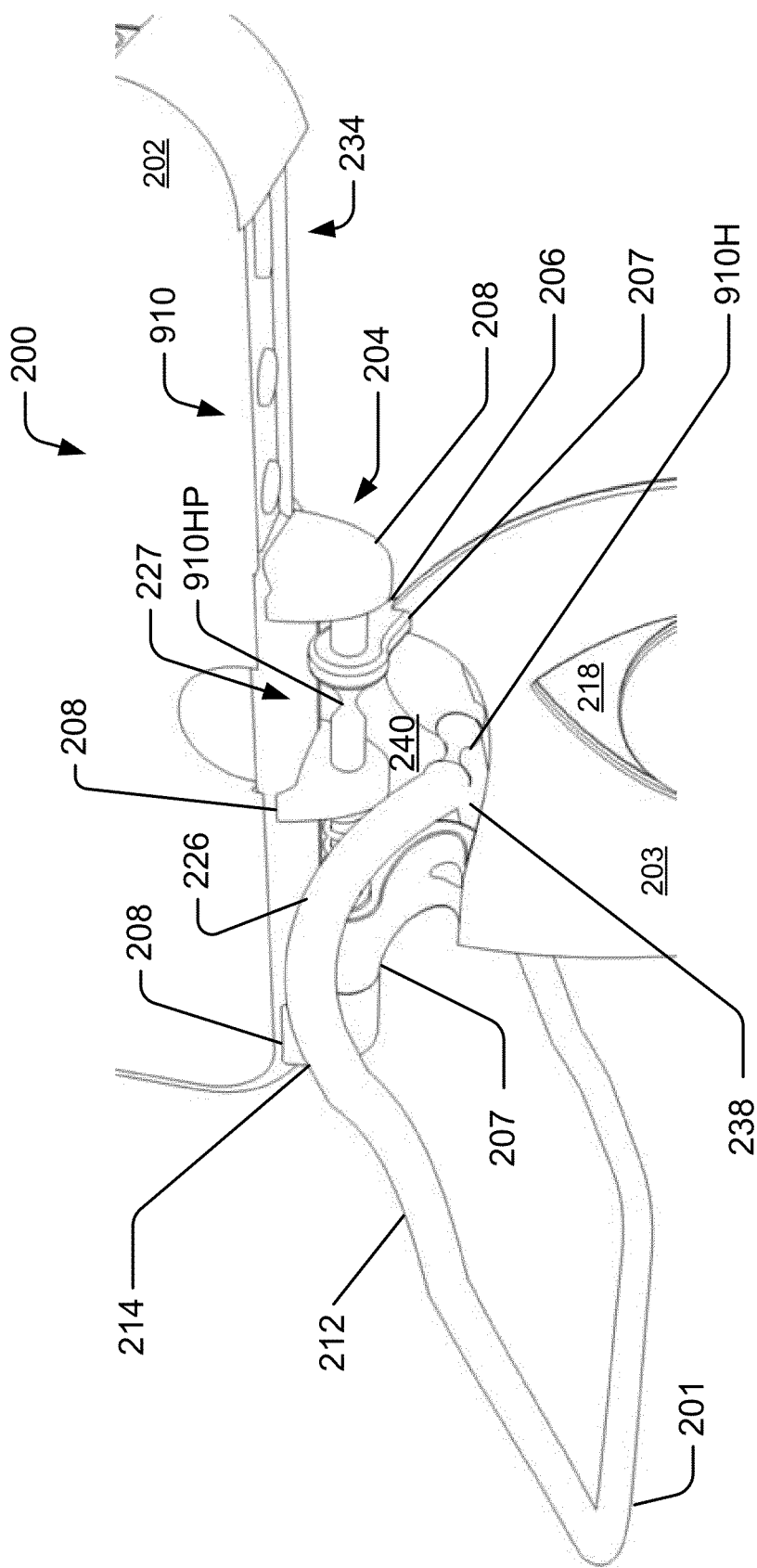
FIG. 8 illustrates a perspective view of a mobile device and stabilizer with the stabilizer deployed and the handle in a position intermediate between its stowed position and its operational position.
Figure 9:
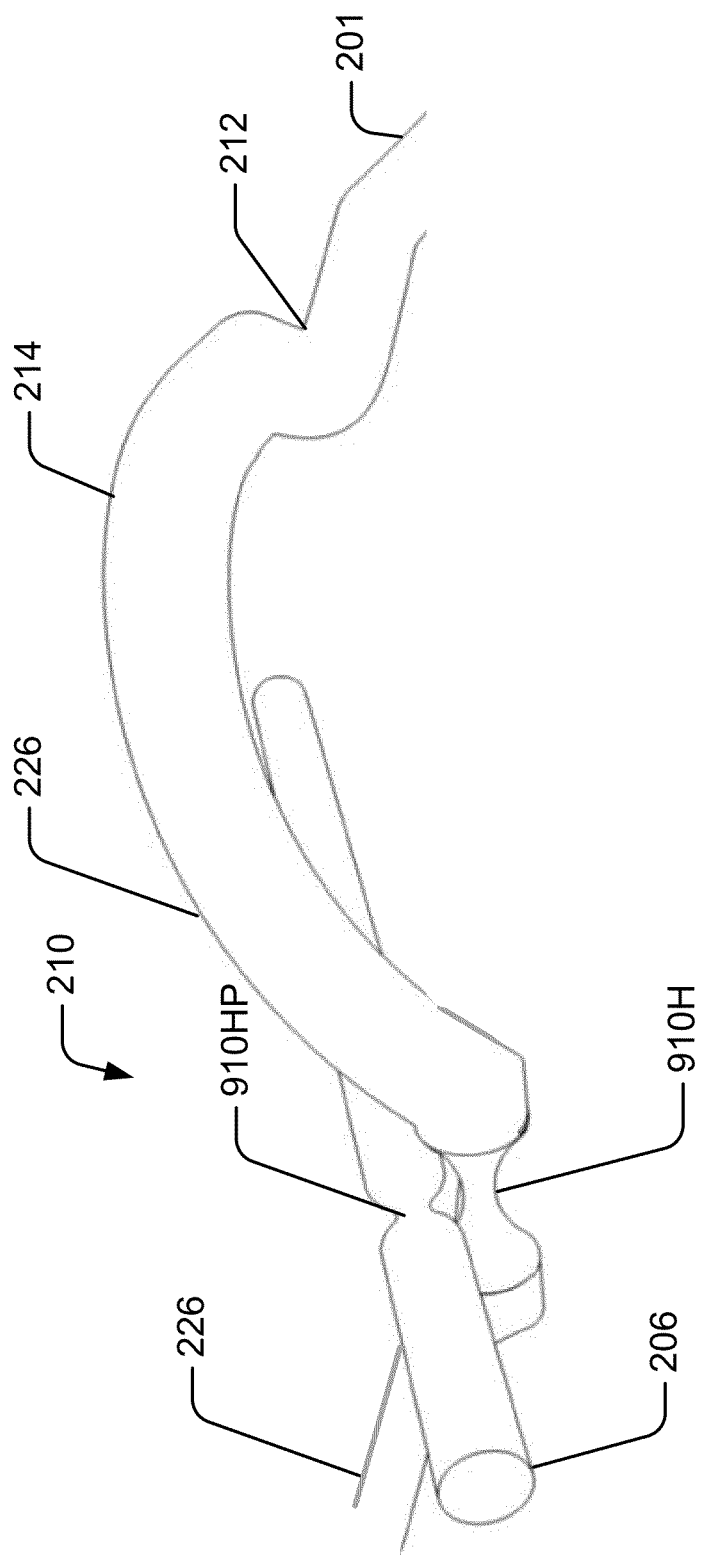
FIG. 9 illustrates a perspective view of a joint between a stabilizer and a mobile device.
Figure 10:
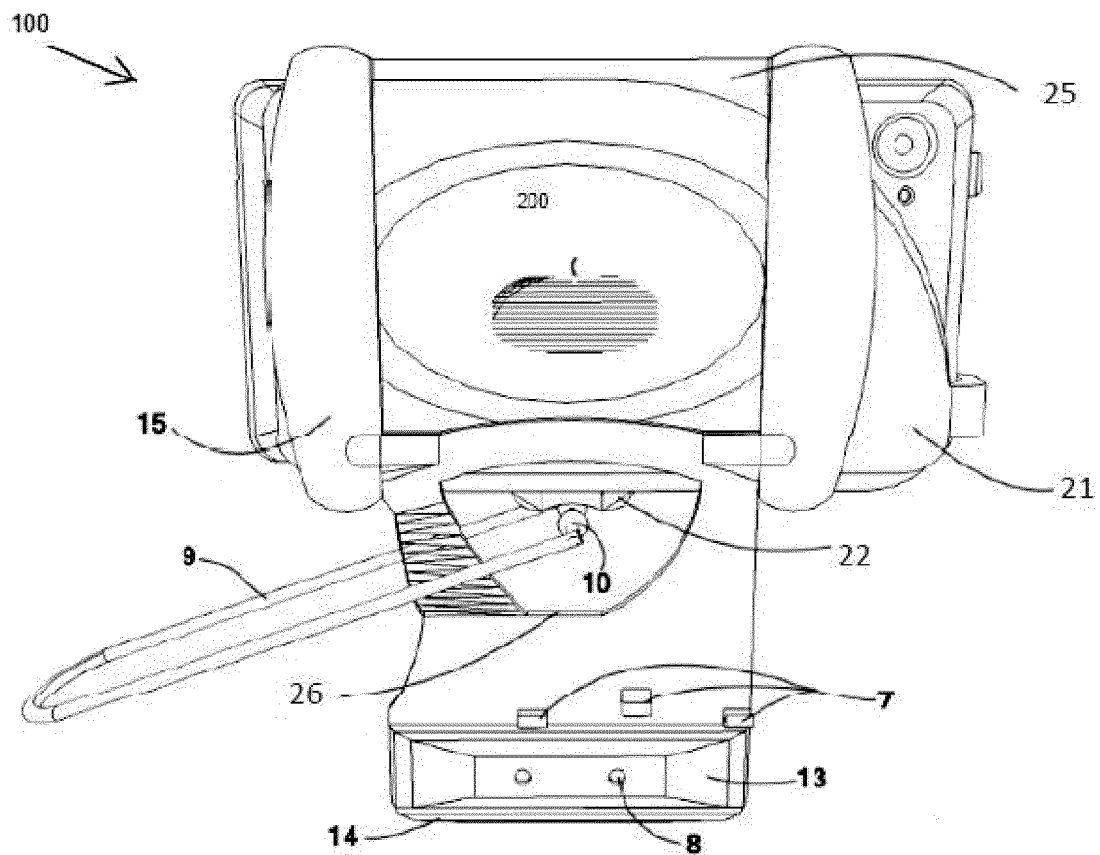
FIG. 10 illustrates a side elevation view of a deployed stabilizer.
Figure 11:
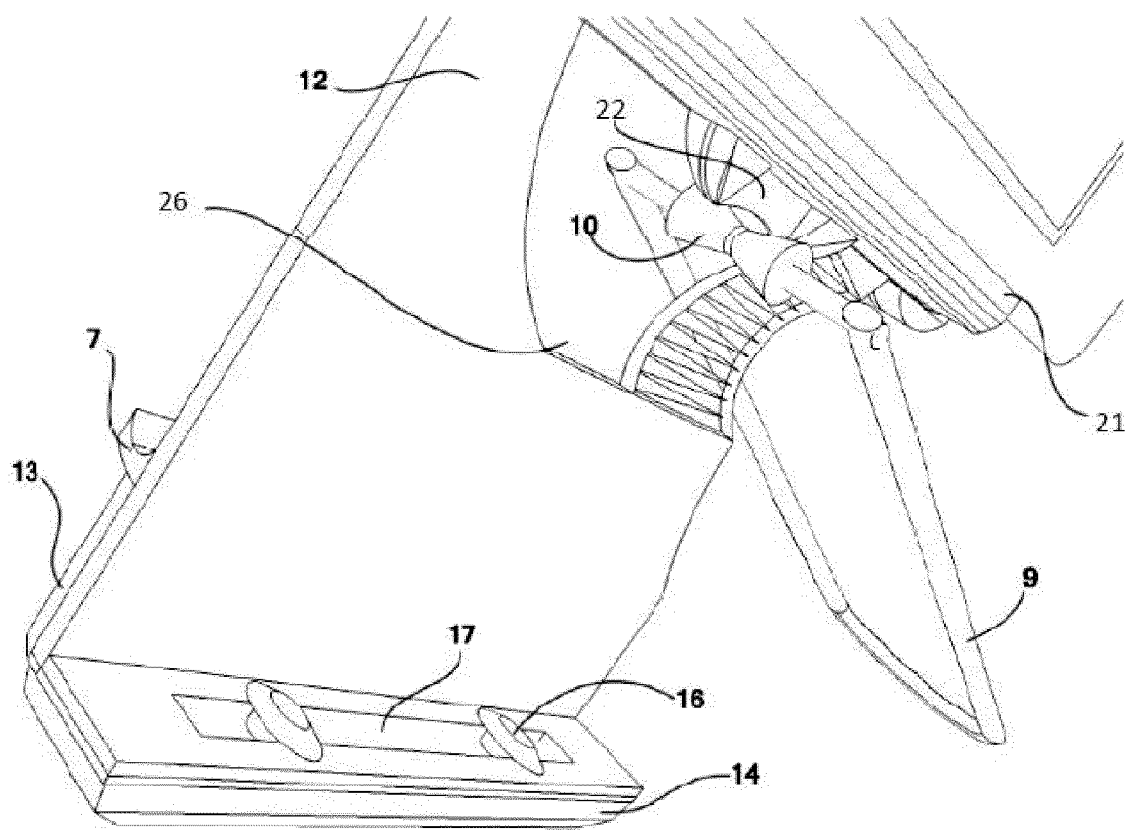
FIG. 11 illustrates a perspective view of a deployed stabilizer.
Figure 12:
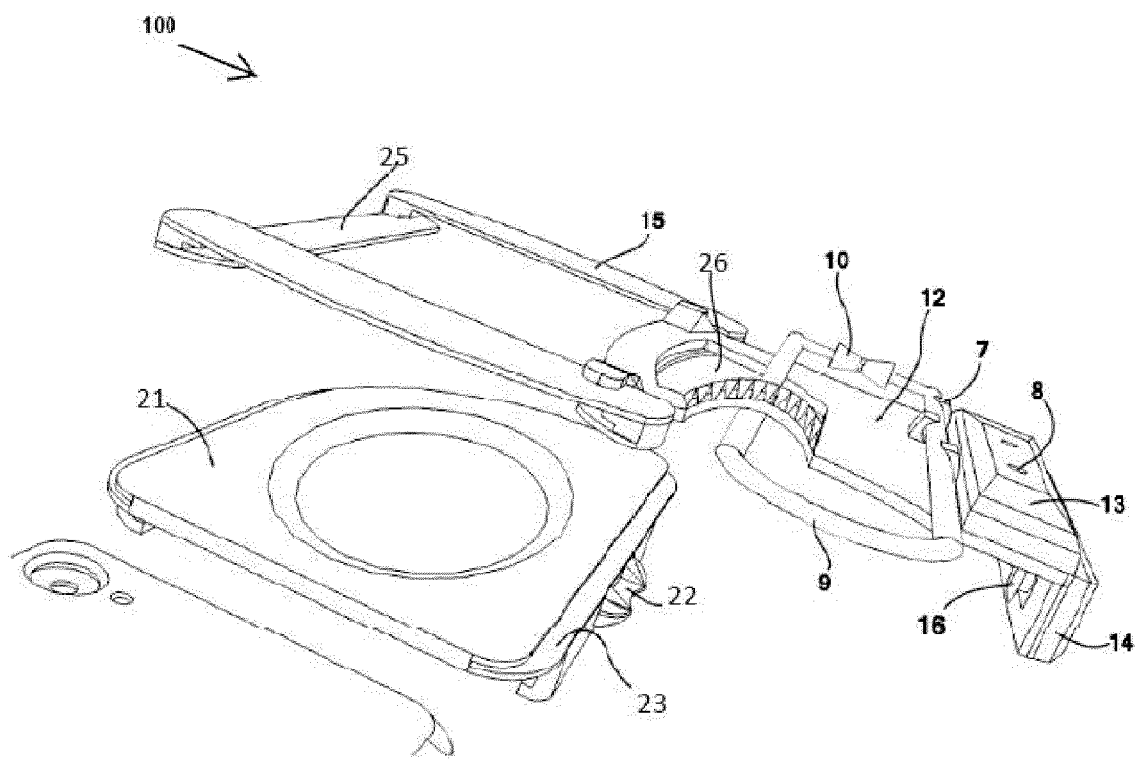
FIG. 12 illustrates a perspective view of a deployed stabilizer and a mobile device.

FIGS. 3-8 further illustrate stabilizers of the current embodiments. More specifically, FIG. 3 illustrates a side elevation view of a mobile device and stabilizer with the stabilizer deployed. FIG. 4 illustrates a top plan view of a mobile device and stabilizer. FIG. 5 illustrates a perspective view of a mobile device and stabilizer with the stabilizer stowed. FIG. 6 illustrates a side elevation view of a mobile device and stabilizer with the stabilizer stowed against the mobile device. FIG. 7 illustrates a perspective view of a mobile device and stabilizer with the stabilizer and the handle in their retained positions. FIG. 8 illustrates a perspective view of a mobile device and stabilizer with the stabilizer deployed and the handle in a position intermediate between its stowed position and its operational position. FIG. 9 illustrates a perspective view of a joint between a stabilizer and a mobile device.

The loop of the handle 201 is shown in FIG. 5 along with the finger grips 212 (which inflect toward the center of the handle 201). Also, the handle portion 910H (see FIG. 9 for more information regarding the handle portion 910H) of the joint 210 appears in the drawing as a narrowed portion of the handle 201. It is also shown in FIG. 8 that it can be spaced apart from the hinge pin portion 910HP (again, see FIG. 9) of the joint 210.

FIG. 6 also illustrates that the hinge frames 207 and 208 enclose the hinge pin 206 and hold it in a generally fixed relationship with the side of the mobile device retainer 202. In a similar manner, the hinge frames 207 and 208 hold the hinge pin 206 in a generally fixed relationship with the side of the counterweight lever 203 (although an offset therefrom of length l2 is illustrated in by FIG. 7). Furthermore, the hinge frames 207 and 208 of the counterweight lever 203 and mobile device retainer 202 can alternate with respect to one another as viewed along the length of the hinge pin 206. Thus, one or the other sets of hinge frames (here, hinge frames 208) can form thrust bearings at the ends of the hinge pin 206. They therefore keep the hinge pin 206 in the hinge 204 rather than allowing it to move laterally. Of course, here, that fixed relationship means fixed in a translational sense. The hinge pin 206 can be allowed to rotate about its longitudinal axis if desired.

Moreover, FIG. 3 illustrates that the hinge 204 defines a joint opening 227 which exposes the hinge pin 206 at a location along the yaw axis such that joint 210 can be formed. FIG. 9 further illustrates this aspect of the current embodiment with reference 910HP indicating a narrowed portion of hinge pin 206. Of course, the joint 210 can be formed by bringing the narrowed portion 910H of the handle 201 into contact with the portion 910HP of the hinge pin 206.

Additionally, FIG. 5 illustrates that a pair of handle clips 230 and 232 can serve to hold the handle 201 against the stabilizer 200 in its stowed position. Indeed, when deploying the stabilizer 200, a user can first free the handle 201 from the handle clips 230 and 232. Then the user can rotate and/or translate the counterweight lever 203 relative to the mobile device retainer 202 through certain intermediate positions such as the one illustrated by FIG. 8. At some point, the user can place the handle portion 910H in contact with the hinge pin portion 210HP. Then the user can maneuver the mobile device 101 via the handle 201 and the stabilizer 200 to obtain desired images 118B (see FIG. 1).

Furthermore, FIG. 7 illustrates that the mobile device retainer 202 can define functional apertures 234. These functional apertures 234 allow access to certain features of a mobile device 101 while it is residing in the mobile device retainer 202. Such features of the mobile device 101 vary from functional aperture 234 to functional aperture 234 and among the various types of mobile devices 101. However, these non-limiting features of the mobile device 101 include mute/silent switches, volume controls, external power/data connectors, etc. The functional apertures 234, it might be noted, can affect the centers of gravity of the various piece parts of the stabilizer 200 of the current embodiment as well as the center of gravity of the overall systems in which they reside. Accordingly, designers can account for the resulting effects with balancing features such as the mass balancing cavities 218 and/or mass balancing weights 224 as might be desired. Choosing the location of the joint 210 can also support this effort if desired.

FIG. 8, meanwhile, further illustrates joint opening 227 through which the handle portion 910H can reach the narrowed portion 910HP of the hinge pin 206 to form joint 210. Of course, the shape and dimensions of the joint opening 227 and pertinent portions of the handle 201 and the hinge pin 206 can be chosen so as to yield desired ranges of relative motion about the joint 210 while iterating the design of certain stabilizers 200.

Moreover, FIG. 7 illustrates that the various balancing features can appear in a number of stylish forms. For instance, certain mass balancing cavities 218 of the stowed counterweight lever 203 (which happens to overlay the mobile device retainer 202 in the current embodiment) can expose portions of the mobile device retainer 202. Furthermore, portions of various mass balancing cavities 218 of the mobile device retainer 202 can correspond with portions of various mass balancing cavities 218 of the stowed counterweight lever 203 to expose the underlying mobile device 101. Again, the effects of such mass balancing features can be factored into the overall design of the stabilizer 200 such that it stabilizes the mobile device 101.

Additionally, a captured portion 238 of the handle 201 is illustrated as being partially retained by the enclosed aperture 240 of the counterweight lever 203 (in FIG. 8). That enclosed aperture 240 is located and shaped to allow the handle 201 be retained in its stowed position and to be moved into its operational position in the joint 210. Thus, while partially retained, the handle 201 remains free to move relative to the counterweight lever 203 (both in translation and rotation) yet within limited ranges (in the current embodiment). Furthermore, the enclosed aperture 240 can be contiguous with the joint opening 227 to allow the handle to traverse from the enclosed aperture 240 to the joint opening 227 portion thereof without obstruction.

The handle, as illustrated in FIG. 7, happens to be retained by both handle clips 230 and 232 of, respectively, the mobile device retainer 202 and the counterweight lever 203. A leg of the handle 201, as illustrated, runs through the slot 236 of the handle clip 232 more or less in parallel with the plane(s) of the counterweight lever 203 and of the mobile device retainer 202. An opening to one side of the handle clip 232 allows the handle 201 to be slidout of that handle clip 232. The other handle clip 230 includes a detent (or other mechanism) which holds the handle 201 in place while also allowing it to be pulled free when desired. Note that FIG. 7 also shows that the handle clips 230 and 232 can be joined by a reinforcing ridge running across the face of the counterweight lever 203. These reinforcing ridges 260, though, can be placed as desired to provide structural strength to the counterweight lever 203 and/or for styling purposes. Of course, the design can account for the effect that these reinforcing ridges might have on the location of the respective centers of gravity.

Additionally, the counterweight 221 can be compactly stowed by some stabilizers. For instance, FIG. 5 illustrates that the counterweight lever 203 (when stowed) holds the counterweight 221 against a side of the mobile device retainer 202. In other words, the length 11 of the counterweight lever 221 can be approximately the same as the width of the mobile device 101 (or mobile device retainer 202). Further, not only does the current embodiment of the counterweight lever 203 hold it there, but it also holds the counterweight 221 flush with the upper and lower surfaces of the mobile device retainer 202 (or mobile device 101). As a result of this aspect (as illustrated by FIG. 7) and other aspects of stabilizers 200 of certain embodiments, the stowed stabilizer 200 can fit in the pocket of many typical users.

FIGS. 6 and 7 illustrate yet another feature of the current embodiment, more specifically, FIGS. 6 and 7 show a key 250, a keyway 252, and a spring 254 which cooperate to secure the counterweight lever 203 in its deployed position. More specifically, the spring 254 is concentric with the hinge pin 206 and is positioned between one hinge frame 208 on the mobile retainer 202 and one hinge frame 207 on the counterweight lever 203. Furthermore, the key 250 couples to the frame 207 of the counterweight lever 203 while the hinge frame 208 of the mobile device retainer 202 defines the key way. The key 250 and keyway 252 are shaped such that when the key 250 is in the keyway 252, they cannot rotate relative to each other. They are also shaped so that they define two stabilizer positions: the first being such that the counterweight lever 203 is deployed and the second being such that the counterweight lever 203 is stowed against the mobile device retainer 202. Of course, when the key 250 is outside of the keyway, the two portions of the stabilizer 200 can rotate relative to each other (at least along an axis defined by the hinge pin 206) between the deployed and stowed positions. Moreover, an angle of about 180 degrees can separate the deployed and stowed positions of the counterweight lever. The spring 254 biases the frames 207 and 208 either away from each other or towards each other. Thus, to move the counterweight lever 203 between positions, a user can push the mobile device retainer 202 and the counterweight lever 203 apart against the spring 254 (or in conjunction with the spring), rotate the counterweight lever 203, and then re-seat the key 250 in the keyway 252 with or without aid from the spring 254.

Note also that FIG. 2 illustrates that the counterweight 221 can have various shapes, dimensions, etc. For instance, the counterweight 221 can have beveled ends, curved surfaces, etc. so that when it is stowed against the mobile device retainer 202, it generally conforms to the shape of the mobile device 101. Moreover, its ends can be curved, rounded, etc. to avoid snags with users clothing as it is slid into and/or removed from their pockets and/or other carrying/stowage devices. Similar provisions can be made with other portions of the stabilizer 200 for similar reasons.

Now with reference to FIG. 9, this drawing illustrates a portion 910HP of a hinge pin 206 in contact with a portion 910H of a handle 201 to form a joint 210 of the current embodiment. Generally, the hinge pin 206 is a cylindrically shaped piece suitable to provide pivotable coupling between the mobile device retainer 202 and the counterweight lever 203. However near the desired location of the joint 210, the hinge pin 206 necks down to form the narrowed portion 910HP for engagement with the corresponding portion 910H of the handle 201. More specifically, the narrowed portion 910HP of the hinge pin 206 can be shaped as a conic curve (as viewed from the side). Thus, the narrowed portion 910HP of the hinge pin 206 defines a location at which the diameter of the hinge pin 206 reaches a local minimum. As the distance from that location increases (in either direction) so does the diameter of the hinge pin 206. Indeed, while the rate of increase need not be constant (and in many embodiment is not), it is often desired that the diameter monotonically increases with distance from the minimum-diameter location on the hinge pin 206. Moreover, that increase can be "strict" in the mathematical sense in that no flats or inflection points occur for some distance from the minimum diameter locations. Strictly increasing monotonic contours are, however, not necessary for the practice of many embodiments. Similarly, the handle also includes a narrowed portion 310H. Although, the contours of the narrowed portions 310 HP and 910H of the hinge pin 206 and handle 201 need not be the same.

While the hinge pin 206 happens to be straight in the current embodiment, the handle 201 in the vicinity of the joint 210 need not be straight. Indeed, in some embodiments, the prongs 226 (see FIG. 2) are shaped such that (with the minimal-diameter points on the hinge pin 206 and handle 201 being in contact) the prongs 226 partially or entirely cross the hinge pin (as they ascend at an angle relative to the yaw axis) as seen from the side. This arrangement is not necessary for the practice of some embodiments although it has been found to aid in preventing collisions between the finger grips 214 (of the handle 201) and proximate portions of the counterweight lever 203. Indeed, it has been found that the embodiments illustrated in FIG. 9 causes sufficient clearance to allow about 20 degrees of pitch-based rotational freedom for the handle 201 relative to the stabilizer 200.

The inventors have also found that the radii of curvature of the contours of the hinge pin 206 and handle 201 in proximity to the minimal-diameter locations plays a role in the behavior of the joint 210. More specifically, as the radii of curvature of the hinge pin 206 and handle 201 portions 910HP and 910H increase (the joint 210 appears more open with more gently sloping contours) the joint 210 allows greater degrees of rotational freedom for the handle 201 (relative to the hinge pin 206). However, increasing radii of curvature also tend to allow the handle 201 greater translational freedom of movement relative to the hinge pin 206. Thus, the radii of curvature can be chosen to allow select amounts of rotational and translational movement for the handle 201.

Note that it is believed that this effect occurs because the weight (or other biasing features) of the stabilizer 200 and mobile device 101 bias the handle 201 against the hinge pin 206 at the contact or pivot point usually defined by the respective minimum-distance locations. The contact force there between (while generally directed along the yaw axis) also causes reactions in the other two axes because the curved surfaces of the portions 910H and 910HP do not necessarily make a "point" contact. Rather, the contact point or area moves up and around the pivot point 912 along one or both surfaces depending on circumstances. Thus, some force arises between the surfaces which biases the portions 910H and 310 HP toward the pivot point 912 as far as translation along the pitch and roll axes is concerned. As a result, the joint 310 tends to be self-centering along these axes while allowing three degrees of rotational movement between the handle 201 and the hinge pin 206.

Another factor that can affect joint performance is the finish of the narrowed portions 910H and 910HP. While lower quality finishes do allow the stabilizer 200 to provide some improvement in the quality of the images (video or otherwise) captured by mobile devices 101, higher polishes allow the handle 201 to pivot with less friction and more smoothly about the hinge pin 206 thereby increasing the smoothness/quality of the resulting captured images 118B. The inventors have found that commercially available and non-limiting surface roughness levels provide satisfactory results without imposing undesirable manufacturing costs.

FIGS. 10-15 illustrate aspects of stabilizers in accordance with some embodiments. Such embodiments generally provide cases 400 for mobile devices, such as video recording devices. As disclosed elsewhere herein, sizes of video recording devices have become increasingly smaller. It is therefore becoming more difficult to record stable video on these devices because of their small size. As a result, users often desire to stabilize these mobile devices in order to yield video recordings of a desired quality. The current embodiment provides cases which contain and stabilize mobile devices without the need for bearings or gimbals. As a result, these cases can be small enough to fit into typical pants pockets.

Thus, FIGS. 10-15 illustrate a case 400 for containing and stabilizing a mobile device 101 according to an embodiment. The case 400 comprises a mobile device housing 421 having a tapered edge 422, a counterweight assembly 424, and a handle 409 having a joint potion (such as a bi-conical rotating cylindrical joint portion 410H). The counterweight assembly 424 may be operationally connected to the mobile device housing 421. The joint portion 410H of the handle 409 is configured to pivot about the tapered edge 422 of the mobile device housing 421. Note that the tapered edge 422 can provide a portion of the joint 410.

For some embodiments, the case 400 may include the mobile device housing 421; the tapered edge 422 connected to the mobile device housing 421; the handle 409; the joint portion 410 which is configured to form a pivot point with the tapered edge 422; the counterweight assembly 424 which is connected to the mobile device housing 421 by the interlocking of a mobile device docking connection 423 and a counterweight assembly docking connection 425; and an extendable counterweight lever 412 which is designed to extend away from the mobile device housing 421 by sliding along a slide assembly 415.

Figure 14:
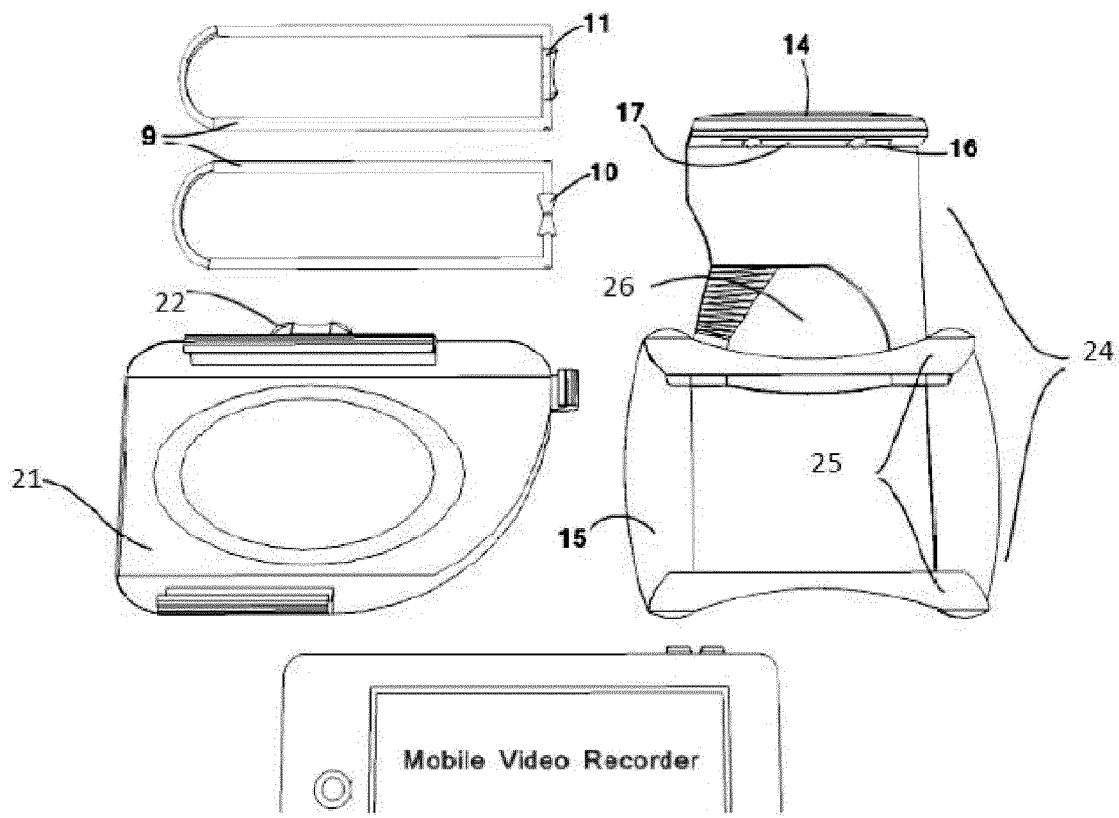
FIG. 14 illustrates a top plan view of components of a stabilizer.

The bi-conical rotating cylindrical joint portion 410H of the handle 409 may rotate along and pivot about the tapered edge 422. For some embodiments, a curved tapered edge joint portion 411 may be included in lieu of the bi-conical rotating cylindrical joint portion 410H, as shown in FIGS. 14-15.

The handle 409 can be stored if desired, when not in use, through a counterweight lever window 426 and held in place by one or more securing handle clasps 407.

Figure 15:
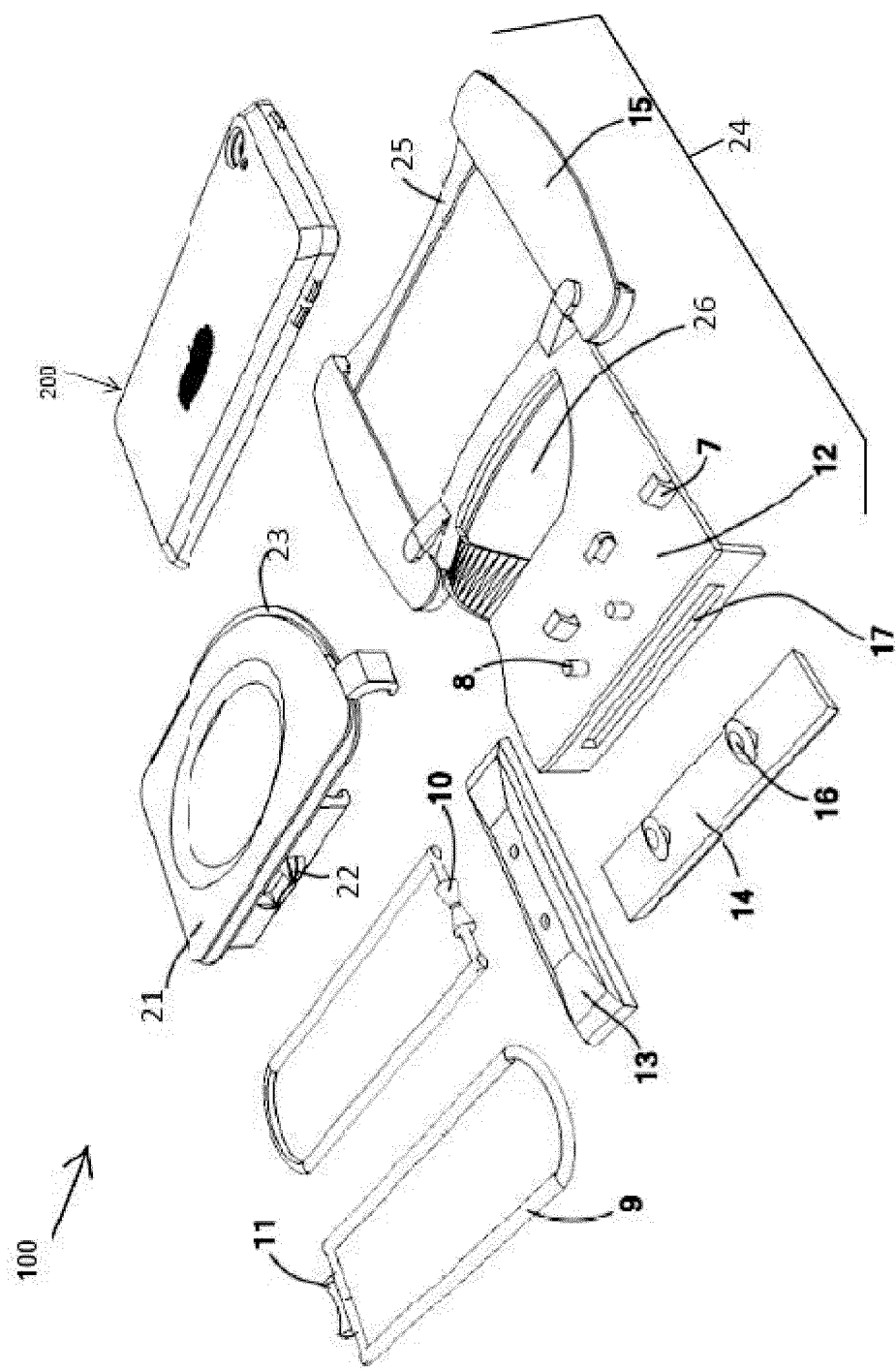
FIG. 15 illustrates a perspective view of components of a stabilizer.

The counterweight assembly 424 of the current embodiment includes the counterweight assembly docking connection 425, the slide assembly 415, the extending counterweight lever 412, the counterweight lever window 426, the securing handle clasps 407, one or more counterweight retention studs 408, and an adjustment weight retention window 417 as shown in FIG. 15.

A weight 413 is connected to the extendable counterweight lever 412 by the counterweight retention studs 408. An adjustment weight 414 is held in place by at least one adjustment weight retainer 416 such that the adjustment weight 414 extends away from the mobile device 101 by sliding along the adjustment weight retention window 417.

During use, the mobile device 101 is inserted into the mobile device housing 421. The extending counterweight lever 412 can be slid away from the mobile device housing 421 via the slide assembly 415. The adjustment weight 414 may be used for balance adjustment as disclosed elsewhere herein. The handle 409 can be unclasped from the securing handle clasps 407 and rotated such that the tapered edge 422 of the mobile device housing 421 rests against the center of the bi-conical rotating cylindrical joint portion 10 of the handle 409.

The mobile device 101 can be connected to the mobile device housing 421 of the current embodiment by the mobile device docking connection 423. Moreover, the mobile device housing 421 is connected to the slide assembly 415 by the counterweight assembly docking connection 425. The extending counterweight lever 412 can be slid away from the mobile device housing 421 through the counterweight lever window 426.

The weight 413 of the current embodiment is connected to the extending counterweight lever 412 by the counterweight retention studs 408. The adjustment weight 414 is configured to be held in place by the adjustment weight retainers 416. Furthermore, the adjustment weight 414 may be slid along the adjustment weight retention window 417 for balance adjustment.

Figure 13:
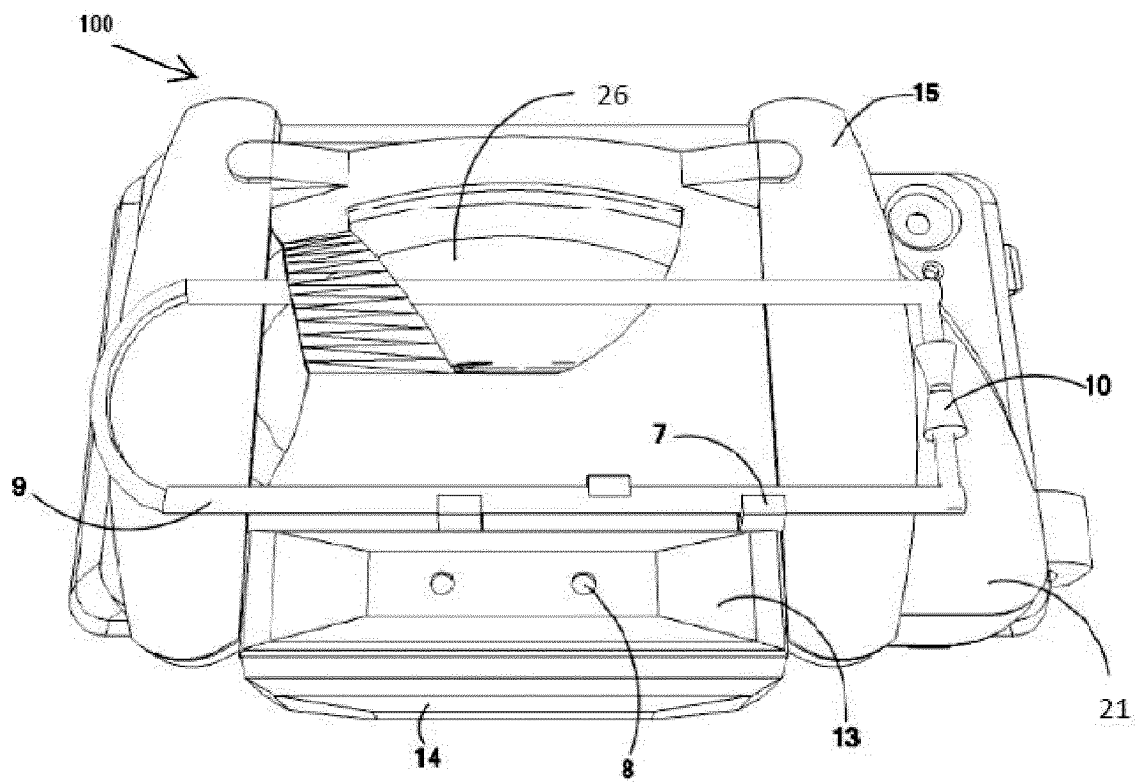
FIG. 13 illustrates a perspective view of a stabilizer in a stowed configuration.

When not in use, and if desired, the handle 409 is folded into the mobile device housing 421 and clasped by the securing handle clasps 407, as shown in FIG. 13.

Figure 16:
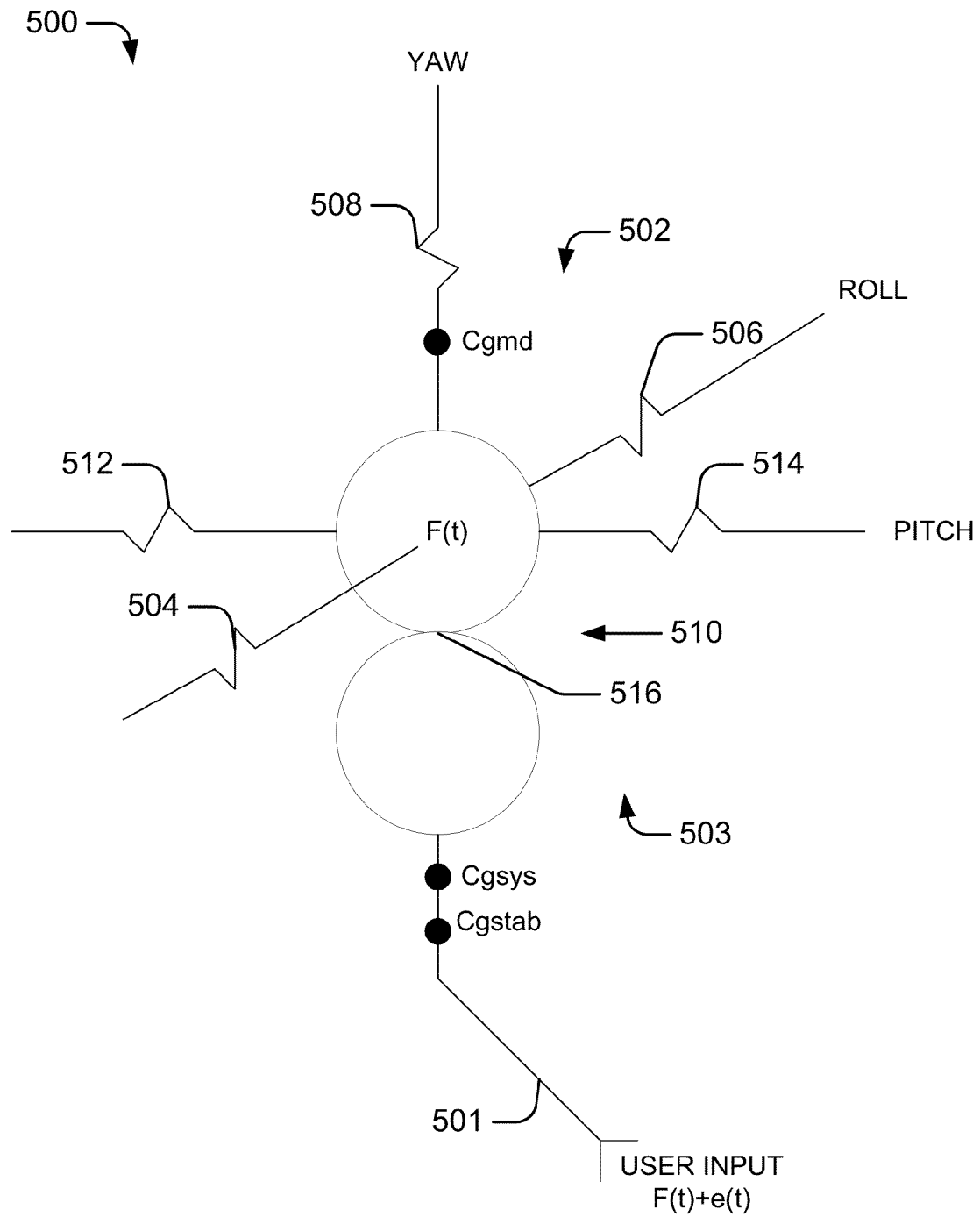
FIG. 16 is a schematic representation of a stabilizer.

FIG. 16 is a schematic representation of a stabilizer. In the current embodiment, a stabilizer 500 is shown in simplified form as a sphere which forms a joint 510 with a handle 501. The handle 500 is also represented in simplified form as a sphere. The joint therefore provides three degrees of rotational freedom between the mobile device 101 and the handle 501. Additionally, the users maneuvering input 502 is modeled as a function of time f(t) representing the desired input and an error signal e(t) which models the jerky, erratic motion often super imposed on the desired input f(t). A plurality of biasing members 504, 506, 508, 512, and 514 couple with the mobile device 101 and bias it toward the pivot point 516 of the joint 510. Thus, the joint 510 is modeled as a self-centering joint. Note that in some embodiments, the biasing members 504, 506, 508, 512, and 514 are areas on hinge portions 510HP and/or areas on handle portions 510H (see FIG. 5). However, any type of biasing members would suffice to center the joint 510. For instance, springs, magnetic bearings, etc. could be used to bias and/or center the joint 510. Additionally, FIG. 16 illustrates the centers of gravity $CG_{MD}$, $CG_{SYS}$, and $CG_{STAB}$ of the mobile device 101, the overall system, and the stabilizer 500 respectively arranged on the yaw axis. Note that the center of gravity of the system $CG_{SYS}$ is below the joint 510 (and the center of gravity of the mobile device $CG_{MD}$ is above the joint on the yaw axis).

Thus, not only does the joint 510 of the current embodiment provide three degrees of rotational freedom between the mobile device 101 and the handle 501, it also prevents (or at least damps) translational movement of the mobile device 101 with respect to the handle 101. Moreover, because of the moments of inertia Mr, My, and Mp about the roll, yaw, and pitch axes respectively, the stabilizer 500 stabilizes the mobile device by removing most if not all of the error signal e(t) from the motion of the mobile device 101.

While the foregoing disclosure and/or the accompanying figures may have implicitly or expressly referred to a particular type of mobile device, the embodiments disclosed herein can be, and are intended to be, configured to work with many types of available mobile devices and those which might arise in the future, which include image capture devices, apparatus, systems, etc. Thus, for example, embodiments can be configured to stabilize an iPhone® 4s (available from the Apple Inc. of Cuppertino, Calif.). But, embodiments do apply to other versions of the iPhone, other Apple Inc. products, Android™ products, Blackberry® products, other cellular and smart phones, laptop computers, notebook computers, tablets, and/or any mobile device incorporating an image capture device.

Furthermore, note that herein certain directional and/or orientation related terms (such as vertical, across, beside, etc.) are used. However, the use of these terms does not limit the subject matter. Rather, these terms are merely used for the sake of convenience and, where they are used, merely indicate a direction/orientation in which the subject (to which they refer) might be found. These terms do not imply, and it is not intended that they be interpreted as the only direction/orientation in which their subjects can be found. Thus, these terms are non-limiting.

Embodiments provide users stabilizers for a wide variety of mobile devices. Embodiments stabilize these mobile devices without requiring gimbals, complex bearing arrangements, cable/pulley arrangements, etc. Moreover, the stabilization thereby provided can be tuned to a particular device by various mass balancing techniques, features, etc. described herein

CONCLUSION

Although the subject matter has been disclosed in language specific to structural features and/or methodological acts, it is to be understood that the subject matter defined in the appended claims is not necessarily limited to the specific features or acts disclosed above. Rather, the specific features and acts described herein are disclosed as illustrative implementations of the claims.

The invention claimed is:

1. A stabilizer for a mobile device comprising a camera, the stabilizer comprising:
    a mobile device retainer configured to retain the mobile device and defining a side and a yaw axis extending through the side;
    a counter weight lever defining proximal and distal ends, the counter weight lever coupled to the retainer near the proximal end;
    a counter weight being coupled to the counter weight lever near the distal end, the stabilizer and the mobile device defining a center of gravity on the yaw axis when the retainer retains the mobile device; and
    a handle pivotable about the mobile device retainer at a bi-conical joint and on the yaw axis, the center of gravity being farther from the side of the mobile device retainer than the pivot point whereby when the center of gravity is under the pivot point the counterweight biases the mobile device retainer against the handle, wherein the bi-conical joint is self-centering along the pitch and roll axes and wherein the handle possesses three degrees of relative rotational movement with respect to the mobile device retainer.

2. A stabilizer for a mobile device comprising a camera, the stabilizer comprising:
    a mobile device retainer configured to retain the mobile device;
    a counter weight lever defining proximal and distal ends, the counter weight lever coupled to the retainer near the proximal end;
    a counter weight being coupled to the counter weight lever near the distal end, the stabilizer and the mobile device to define a center of gravity on the yaw axis when the retainer retains the mobile device; and
    a handle pivotable about the mobile device retainer at a pivot point on the yaw axis, the center of gravity to be farther from the side of the mobile device retainer than the pivot point wherein the positionable portion of the handle to at least partial define a bi-conical joint.

3. The stabilizer of claim 2, further comprising one of a bi-conical joint or tapered edge joint to define the pivot point.

4. The stabilizer of claim 2, further comprising a hinge pin, the counter weight lever being pivotably coupled to the retainer via the hinge pin.

5. The stabilizer of claim 2, further comprising a handle retainer of the counter weight lever whereby a portion of the handle is positionable at the pivot point.

6. The stabilizer of claim 2, wherein the mobile device retainer further defines a pitch axis, the counter lever being configured to allow a position of the counter weight to be adjusted in a direction parallel to the pitch axis.

7. The stabilizer of claim 2, wherein the mobile device retainer further defines a roll axis, the counter lever being configured to allow a position of the counter weight to be adjusted in a direction parallel to the roll axis.

8. The stabilizer of claim 2 wherein the counterweight to bias the counterweight lever and handle together along the yaw axis.

9. The stabilizer of claim 2 wherein the counterweight lever partially retains the handle.

\* \* \* \* \*